United States Patent [19]
Weyand et al.

[11] Patent Number: 6,068,803
[45] Date of Patent: May 30, 2000

[54] METHOD OF MAKING BUILDING BLOCKS FROM COAL COMBUSTION WASTE AND RELATED PRODUCTS

[75] Inventors: Thomas E. Weyand, Beaver Falls; Casimir J. Koshinski, Ambridge; Wolfgang Baum, Coraopolis, all of Pa.

[73] Assignee: Pittsburgh Mineral and Enviromental Technology, Inc., New Brighton, Pa.

[21] Appl. No.: 09/025,209

[22] Filed: Feb. 18, 1998

Related U.S. Application Data

[63] Continuation-in-part of application No. 08/674,699, Jul. 9, 1996, abandoned.

[51] Int. Cl.[7] .............................. C04B 40/00; C04B 14/02
[52] U.S. Cl. ............................ 264/82; 106/705; 106/710; 264/333; 264/DIG. 19
[58] Field of Search ............................ 264/333, DIG. 49, 264/82; 106/705, 710

[56] References Cited

U.S. PATENT DOCUMENTS

| | | | |
|---|---|---|---|
| 2,724,656 | 11/1955 | Gunzelmann et al. | 106/120 |
| 3,501,323 | 3/1970 | Moorehead | 106/97 |
| 4,115,256 | 9/1978 | de Zeeuw | 209/3 |
| 4,121,945 | 10/1978 | Hurst et al. | 106/288 B |
| 4,387,801 | 6/1983 | Minnick | 264/140 |
| 4,453,978 | 6/1984 | Okimura et al. | 106/88 |
| 4,517,078 | 5/1985 | Inculet et al. | 209/127.3 |
| 4,683,006 | 7/1987 | Walker | 106/288 |
| 5,160,559 | 11/1992 | Scovil et al. | 156/73.6 |
| 5,211,750 | 5/1993 | Smith et al. | 106/710 |
| 5,227,047 | 7/1993 | Hwang | 209/166 |
| 5,350,549 | 9/1994 | Boyle | 264/40.4 |
| 5,358,760 | 10/1994 | Furlong | 428/70 |
| 5,362,319 | 11/1994 | Johnson | 106/705 |
| 5,366,548 | 11/1994 | Riddle | 106/705 |
| 5,374,307 | 12/1994 | Riddle | 106/705 |
| 5,584,895 | 12/1996 | Seike et al. | 44/598 |
| 5,665,290 | 9/1997 | Koslowski et al. | 264/669 |

FOREIGN PATENT DOCUMENTS

| | | |
|---|---|---|
| 3734879 | 3/1989 | Germany . |
| 4340786 | 6/1995 | Germany . |
| 1186685 | 4/1970 | United Kingdom . |
| 1575075 | 9/1980 | United Kingdom . |
| 8910333 | 11/1989 | WIPO . |

OTHER PUBLICATIONS

Table 2, "The Chemistry of Cements"; Taylor, H.F.W., Academic Press, 1964.
U.S. Department of the Interior; "Steam–Cured Bricks From Industrial Mineral Wastes"; 1974.
"Mineral Composition, Microstructure, and Physical Properties of Calcium Silicate Bricks"; H. Mortel; Fortschritte der Mineralogie, 58, pp. 37–67, 1980.
"Sand Fly–Ash Bricks," Materials Research Standards, USA (1964).
Patent Abstracts of Japan, vol. 013, No. 384 (C–629), Aug. 24, 1989 and JP 01 133964 A (Mitsubishi Heavy Ind. Ltd), May 26, 1989.
Patent Abstracts of Japan, vol. 096, No. 005, May 31, 1996 and JP 08 001126 A (NGK Insulators Ltd), Jan. 9, 1996.

*Primary Examiner*—James Derrington
*Attorney, Agent, or Firm*—Eckert Seamans Cherin & Mellott, LLC

[57] ABSTRACT

A method of making a building block from waste particulate siliceous materials, such as fly ash, bottom ash, and rock mineral fines, includes employing a major amount of such waste particulate materials in combination with a calciferous additive and water to cure and shape the same under the influence of controlled pressure and temperature for a predetermined time to create building block which is characterized by a mineralogical crystalline phase. Preferred ratios of fine waste particulate material and coarser waste particulate materials are disclosed. The product produced by the method is also disclosed.

18 Claims, 3 Drawing Sheets

METHOD OF MAKING BUILDING BLOCKS FROM COAL COMBUSTION WASTE AND RELATED PRODUCTS

This application is a continuation-in-part application of U.S. patent application Ser. No. 08/674,699 filed Jul. 9, 1996 now abandoned.

BACKGROUND OF THE INVENTION

1. Field of the Invention

This invention relates to an improved method for the manufacture of shaped building blocks from selected coal combustion wastes and related products. More specifically, the invention relates to a method for producing high strength building blocks of precise dimensions and desired properties from coal combustion fly ash and bottom ash and related products.

2. Description of Related Art

Due to the rapidly diminishing availability of suitable landfill space and the escalating cost of land disposal, the daily generation of large volumes of coal combustion wastes at coal-fired power plants has created a costly disposal problem for electric utility companies throughout the world. Accordingly, power companies operating such plants have intensified their efforts to find high volume, income producing, commercial uses for coal combustion fly ash and bottom ash that provide economical alternatives to landfill disposal of these wastes.

There currently exists a number of known commercial uses for coal combustion fly ash and bottom ash as substitute materials in the production of low strength cementicious products. In one such use, the pozzoulanic properties of fly ash have established this waste product as a substitute for Portland cement in the production of concrete. The widespread use of fly ash in this application, however, requires that the carbon content of the ash be less than 3% by weight. The utilization of fly ash as a constituent in concrete is disclosed in U.S. Pat. Nos. 4,115,256, 4,121,945, 4,453,978, 4,517,078, 5,160,559, and 5,227,047, which disclose various means, including combustion, electrostatic, magnetic, air classification, and flotation means, for removing carbon from fly ash or chemical means to neutralize the negative effect of carbon on the properties of the concrete. As a result, the requirement for such reduced carbon content involves additional processing of the fly ash and undesirable associated capital investment and processing costs.

It is obvious from the foregoing disclosures that, in order to utilize large volumes of fly ash on a continuing basis, a commercial application must be found in which the carbon content of the fly ash has a less adverse effect upon the properties of the product in which it is incorporated. One such application, disclosed in U.S. Pat. No. 5,211,750, involves combining fly ash with flue gas desulfurization sludge, lime, and water, and compacting the resulting mixture into a shaped cementiciously-bonded product that is subsequently cured and crushed to yield an aggregate having a compressive strength in the range of 1,000–4,000 psi.

Another known method for utilizing fly ash as a constituent in a shaped cementiciously-bonded product, disclosed in U.S. Pat. No. 4,397,801, involves mixing (a) pulverized fly ash, (b) a spent fluidized bed combustion residue containing limestone particles and oxidic sulfur compounds, and (c) water, with or without the addition of Portland cement. The mixture is compacted to form a shaped masonry block which is subsequently crushed to create an aggregate used as a constituent in concrete, mortar mixes, and road base materials. The shaped masonry block produced prior to crushing is said to have exhibited compressive strengths that varied over time. The strengths were said to increase from 770–1,970 psi seven days after compacting to 1,570–2,950 psi twenty-eight days after compacting. Such strength levels are well below those required for high strength structural building bricks and blocks. U.S. Pat. No. 5,350,549 also discloses combining fly ash with spent fluidized bed material to form a shaped cementiciously-bonded composition. In this case, an aggregate is produced by curing the formed shape under ambient conditions while saturating the shape with water.

In yet another method for producing cementiciously-bonded construction products from coal combustion wastes, disclosed in U.S. Pat. No. 5,362,319, fly ash or bottom ash, with or without the addition of at least one other component selected from the group consisting of paper mill waste, lime, clay, Portland cement, or plaster of paris, is mixed with a strong oxidant to produce a shaped body that is allowed to harden and strengthen over time at ambient conditions.

A method of producing a stabilized cementiciously-bonded building block from both fly ash and bottom ash is discussed in U.S. Pat. No. 5,358,760. In this method, fly ash and bottom ash are combined with gypsum, lime, and calcium carbonate. The resulting admixture is formed into a block under a compressive force; and the block is allowed to cure under ambient conditions without the application of external heat. Construction blocks produced in this manner were said to exhibit a compressive strength of only 1,341 psi.

Another known method of utilizing both fly ash and bottom ash to produce shaped cementiciously-bonded structural products, disclosed in U.S. Pat. Nos. 5,374,307 and 5,366,548, involves adding water to a mixture of fly ash and bottom ash, which may or may not contain one or more additional waste products or sand or clay, and compressing the moistened mixture at a pressure in the range of 1,000 to 2,500 psi to form a molded body which is said to subsequently cure and strengthen at ambient conditions. Structures produced in this manner generally exhibited compressive strengths in the range of 1,900–3,600 psi.

These prior art disclosures produce shaped construction products that exhibit relatively low compressive strengths that increase slowly with time to ultimate levels that are inadequate for the use of these products as high-strength building brick or block. This lack of strength is believed to be due, primarily, to insufficient crystal formation and growth caused by curing the formed structures at ambient conditions, and the lack of control of temperature, pressure, humidity, and time during the curing process. The absence of significant crystal growth prevents the formation of a strong interlocking crystalline matrix. A typical cementiciously-bonded structure is that of a standard concrete building block. A structure of this type, which is typified by the lack of significant crystal formation and growth and the absence of a high strength interlocking crystalline matrix, normally yields a compressive strength of less than 3,500 psi. Such a structure, magnified 2,000 times, is shown in the photomicrograph of FIG. 1.

High strength, crystalline-bonded shaped building products produced from naturally-occurring materials, and methods for their manufacture, are known in the art. Calcium silicate bricks, produced essentially from sand and lime and intended for use in brick masonry applications, are disclosed in the American Society For Testing Materials specification ASTM C73–94a. Shaped building bricks and blocks of this type are produced on a commercial basis by Schneider Kalksandsteine GmbH in Germany and a number of other companies in Europe. Such bricks and blocks are known to be widely used in residential and commercial building construction in Germany, the Netherlands, and Russia.

Calcium silicate bricks are normally produced by mixing 85%–96% sand, 3%–8% lime, and up to 10% water, compacting the mixture to form a shaped body, and curing said body at an elevated temperature in pressurized steam for a time sufficient to allow the formation and growth of calcium silicate crystals. The compacting pressure employed normally ranges from 2,500 psi to 10,000 psi. Curing is normally accomplished by autoclaving the shaped bodies in an atmosphere of saturated steam at a temperature in the range of 180° C. to 220° C. and a pressure in the range of 200 psi–300 psi for a period of 4 to 6 hours.

Calcium silicate bricks produced from naturally-occurring materials under such conditions are reported to exhibit compressive strengths ranging up to 8,000 psi ("The Chemistry of Cements," Taylor, H. F. W., Academic Press). This dramatic improvement in strength has been attributed to the formation of a ubiquitous strong, interlocking crystalline matrix that tightly binds the mineral particles in the structure. It has been reported that the calcium silicate crystal phase most responsible for imparting strength to the interlocking crystalline matrix is Tobermorite, a hydrated calcium silicate species (Mortel, H., "Mineral Composition, Microstructure, and Physical Properties of Calcium Silicate Bricks," *Fortschritte der Mineralogie*, 58, pp 37–67, 1980). The structure (magnified 2,000 times) of a typical commercial calcium silicate building product manufactured from naturally-occurring materials showing the interlocking Tobermorite crystal matrix responsible for strengthening, is illustrated in the photomicrograph in FIG. 2.

U.S. Pat. No. 5,665,290 teaches that the addition of ground waste glass to a mixture comprised of a clay-containing material resulting from the burning of brown coal, quartz sand, lime, and water, support a pozzoulanic reaction that enhances the stability of the pressed brick shape produced therefrom during the drying prior to conventional firing of the dried brick.

The combination of compacting and steam-curing has also been used to produce high strength shaped building products from man-made wastes, such as copper mine tailings, zinc mine tailings, asbestos fines, and roofing granules (United States Department of the Interior, Bureau of Mines, Report of Investigation 7856, "Steam-Cured Bricks From Industrial Mineral Wastes," 1974). Building bricks of this type, produced by blending one of the aforementioned mineral wastes with calcium hydroxide or Portland cement, and compacting and steam-curing under conditions similar to those used to produce bricks from naturally-occurring minerals, are said to exhibit compressive strengths similar to those heretofore reported for bricks produced from naturally-occurring minerals.

Crystalline-bonded construction products incorporating coal combustion wastes and methods for their manufacture are also known in the art.

U.S. Pat. No. 4,683,006 discloses a low strength, crystalline-bonded shaped construction aggregate produced by mixing pulverized fly ash with lime, shaping the mixture, and curing the shaped mixture in a moisture-controlled atmosphere at temperatures in the range of 35° C. and 80° C. The strength of the resultant shaped body is attributed to a pozzoulanic bond that includes mechanical bonds formed by crystallites of Ettringite and amorphous calcium silicate, calcium aluminate, or calcium aluminum silicate, or mixtures thereof. The compressive strength of the shaped bodies so formed was said to be less than 100 psi.

U.S. Pat. No. 3,501,323 discloses a process for the manufacture of building, structural, and paving products based upon blending extremely fine siliceous material, a calciferous material, and water, molding the blend by compacting at pressures in the range of 10,000 psi to 20,000 psi, and hydrothermally treating the molded product at a temperature above 250° C. for a total time at pressure of less than about 30 minutes. This patent teaches an average particle size of siliceous material in the range of about 4 microns to 48 microns (1,000–12,000 centimeters$^2$/gram) and a weight ratio of siliceous material:calciferous material of about 1:2 (33.3% by weight of calciferous material).

The use of fly ash as a partial substitute for sand in the production of calcium silicate-type brick has previously been reported in "Sand Fly-Ash Bricks," Materials Research Standards, USA (1964) and in Report 18 of the Research Association of Calc Sandstone (Germany), The Use of Industrial Waste Products, Their Influence On The Characteristics Of Calc Sandstone," Part II, Hard Coal Filter Ash, May 1970.

None of these prior art processes, or any product resulting therefrom, is adapted to utilize larger volumes of coal combustion wastes in the manufacture of shaped building products nor to significantly reduce the volume of coal combustion fly ash and bottom ash currently being disposed in landfills by permitting large volumes of such wastes to be utilized as the major raw material components in the manufacture of high strength shaped construction products. There remains, therefore, a need for a practical method for the manufacture of high strength, crystalline-bonded building bricks and blocks composed primarily of coal combustion fly ash and bottom ash. A process capable of producing such bricks and blocks would substantially reduce the need for landfill disposal of these wastes and be of great economic value to operators of coal combustion power plants.

SUMMARY OF INVENTION

The present invention has met the hereinabove described needs. The invention provides a method for producing high strength shaped construction products composed primarily of a combination of coal combustion wastes. The method preferably involves the production of building brick and block by combining particulate siliceous materials, such as coal combustion fly ash and bottom ash, with or without the addition of other particulate non-ash siliceous materials which may or may not be process wastes, with an additive that enhances the formation of mineralogically-based crystals and forming and curing the brick and block under conditions that result in the formation of a stable interlocking crystalline matrix that imparts the desired structural strength and stability to said brick and block.

In a preferred practice of the method of the invention, a calciferous additive, such as lime, may be employed as the additive and water is blended into the mixture. Curing is preferably effected at elevated temperature and pressure for a predetermined period of time to produce the desired mineralogical crystalline phase. Certain preferred ratios of fly ash to bottom ash are provided. The invention also provides a related product.

It is an object of the present invention to provide a high strength, structurally stable shaped building product consisting essentially of particulate siliceous materials, such as coal combustion fly ash and bottom ash, with or without the addition of other particulate non-ash siliceous materials, and an economical, efficient method for its manufacture.

It is another object of the invention to provide such a high strength, structurally stable shaped building product in which the high strength and structural stability are imparted by an interlocking crystalline matrix that intimately bonds the fly ash and bottom ash particles within the product structure.

It is a further object of the invention to provide such a high strength, structurally stable shaped building product in which the interlocking crystalline matrix is achieved by making said product under controlled conditions of elevated temperature, pressure, and humidity.

It is a further object of the invention to provide a method of making a high strength, structurally stable shaped building product consisting essentially of coal combustion fly ash and bottom ash which product is strengthened by an interlocking crystalline matrix in which said matrix consists primarily of hydrothermally-grown Tobermorite crystals.

It is a further object of the invention to provide a high strength shaped man-made building product in which the major ingredients are man made and the adverse effects of impurities on mechanical properties are significantly reduced.

It is a further object of the invention to provide a method of making a precisely shaped building product from a mixture of coal combustion fly ash and bottom ash by applying pressure to said mixture in a mold of the desired shape.

It is a further object of this invention to provide a method of making a load bearing building product of improved quality and consistency.

It is a further object of this invention to provide a method of making a precisely shaped building product having a permanently colored exterior surface.

It is yet another object of the invention to provide such a method and a related product which can be made without requiring reduction in the carbon content of the fly ash.

These and other objects of the invention will be more fully understood from the following detailed description of the invention on reference to the figures appended hereto.

DESCRIPTION OF PREFERRED EMBODIMENTS

Figure 1:
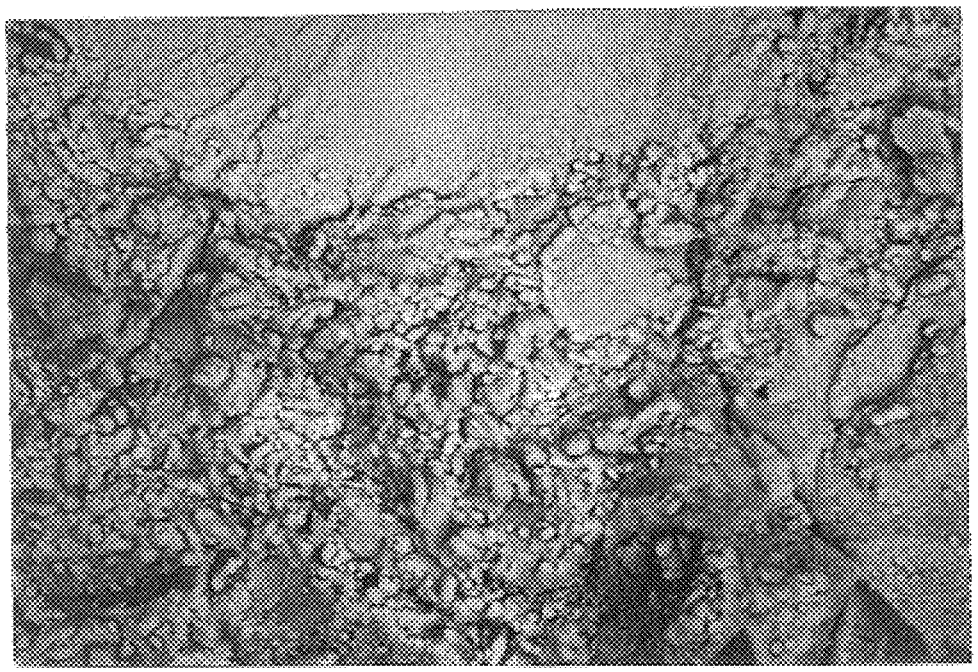
FIG. 1 is a photomicrograph showing a prior art structure, at a magnification of 2,000×, of a cementiciously-bonded shaped concrete building product.
Figure 2:
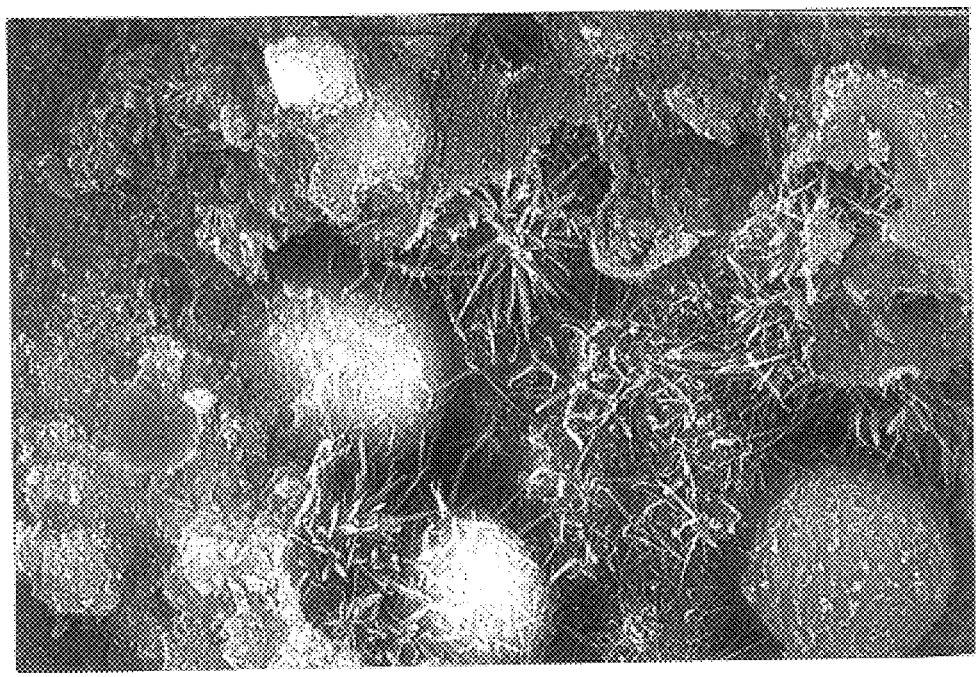
FIG. 2 is a photomicrograph showing a prior art structure, at a magnification of 2,000×, of a crystalline-bonded shaped building product manufactured from naturally-occurring sand and lime.

As employed herein, the terms "building blocks" or "building bricks" are employed interchangeably and shall mean structural building blocks or bricks of predetermined shape or size, a plurality of which are adapted to be employed in an assembled array in walls, in roads or walkways, and related building product and non-building product uses, or aggregate pieces, regardless of whether the blocks or bricks are load bearing or not and regardless of whether they have rectangular faces or not.

As employed herein, the term "dry mixture" refers to a mixture containing a first particulate siliceous material (e.g., coal combustion fly ash), a second particulate siliceous material (e.g., coal combustion bottom ash), and a calciferous additive.

As employed herein, the terms "wet mixture", "moistened mixture", and "moistened blend" are used interchangeably and refer to a mixture containing a first particulate siliceous material (e.g., coal combustion fly ash), a second particulate siliceous material (e.g., coal combustion bottom ash), and a calciferous additive mixed with a liquid, such as water.

As employed herein, the term "non-ash waste particulate material" refers to a waste particulate material formed in a manner other than as a result of a combustion process.

As employed herein, the term "waste particulate siliceous material" refers to a particulate siliceous material formed as a by-product in the commercial processing or combustion of siliceous material which may include, but not limited to, limestone, rock, gravel, sand, coal and metal bearing ores.

The present invention is applicable to the production of a broad spectrum of shaped building blocks or bricks from a mixture comprised essentially of particulate coal combustion wastes and an additive that reacts with such wastes to form a ubiquitous crystalline matrix that tightly binds said individual waste particles into a strong, coherent, stable structure.

The invention provides a method of (a) establishing a blend by combining a first particulate waste siliceous material, such as a coal combustion fly ash, and a second particulate waste siliceous material, such as a coal combustion bottom ash, with or without the addition of other non-ash particulate siliceous materials, with a calciferous additive, (b) blending the resulting ash/additive blend with water, (c) compacting the moistened blend into the desired shape at a pressure sufficient to attain intimate contact among the fly ash, bottom ash, and additive particles, and (d) curing said compacted shape under conditions of elevated temperature and pressure in a moisture laden atmosphere for sufficient time to permit nucleation and growth of an interlocking crystalline matrix comprised essentially of hydrothermally-formed calcium silicate-based crystals that imparts structural strength and stability to said cured shape.

Structural analyses, performed by means of scanning electron microscopy (SEM) and x-ray diffraction (XRD), of shaped building blocks produced in accordance with the method of this invention, indicate that the strength and stability of said building product is effected by an interlocking matrix of calcium silicate crystals of the Tobermorite ($Ca_5Si_6O_{17}\cdot5H_2O$) species or variations thereof. The SEM photomicrograph illustrating the structure (magnified 2,020×) of such a product, shown in FIG. 3, reveals the interlocking crystallite matrix 1 connecting and tightly binding the fly ash particles 2 and the bottom ash particles 3 in the structure, thereby imparting structural strength and stability to the resultant product.

Figure 3:
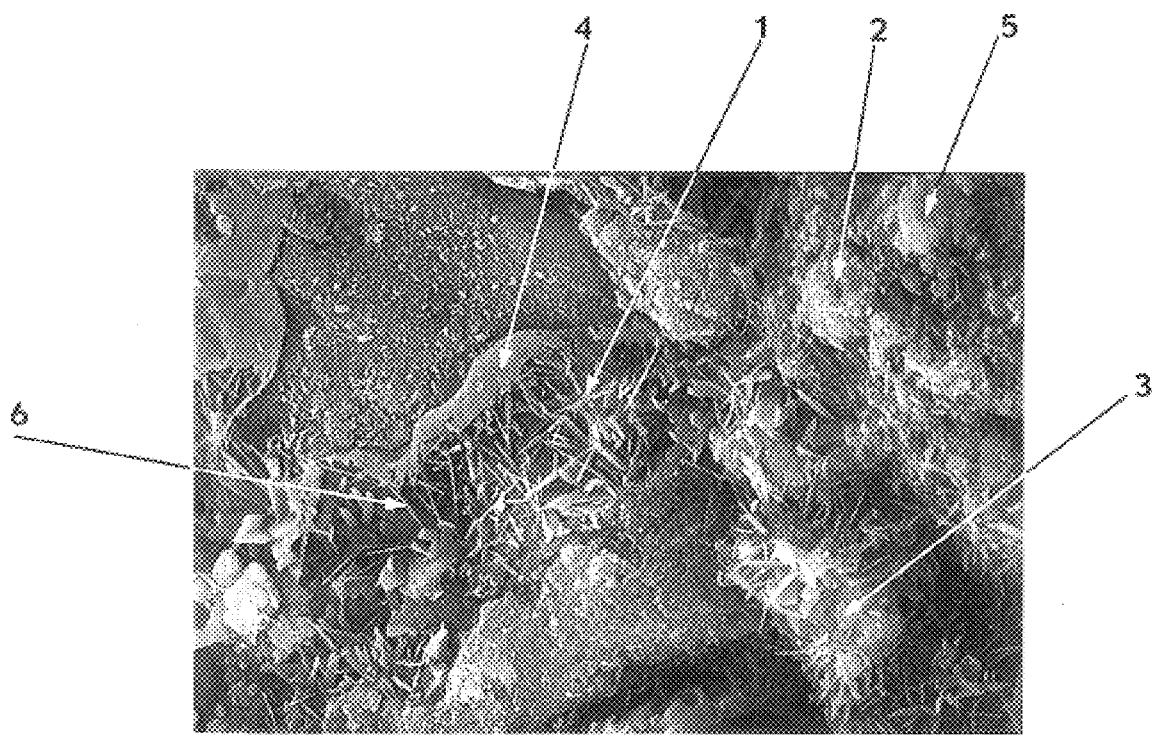
FIG. 3 is a photomicrograph showing the structure, at a magnification of 2,000×, of a crystalline-bonded shaped building product produced from coal combustion fly ash and bottom ash in accordance with the present invention.

FIG. 3 also shows that the fly ash particles 2 and bottom ash particles 3 in the structure are coated with a layer of hydrous calcium silicate 4 from which individual Tobermorite crystals 6 nucleate and grow. Impurity particles 5 in the structure, including ferritic and carbonaceous particles, are similarly coated with a layer of hydrous calcium silicate. The presence of such coatings on the surface of the impurity particles render such particles inert and minimizes any negative effect that the particles might have on the strength and stability of the cured structural shape.

The preferred method of the invention involves procedures that maximize the level of particle coating, significantly increase the degree of particle-to-particle contact in the mass, and maximize the extent of Tobermorite crystallite nucleation and growth within the structure. These preferred method steps include, but are not limited to, optimization of (a) the proportion of fly ash:bottom ash in the mixture and the particle size distribution resulting therefrom, (b) the type and amount of calciferous additive employed, (c) the quantity of water added to the ash/additive mixture, (d) the pressure used to form the desired shape, and (e) the temperature, pressure, humidity, and time employed during curing of the formed shape.

Suitable high strength shaped building products can be produced in accordance with the present invention from commercially-generated coal combustion fly ash and bottom ash without requiring reduction in carbon content in the ash. Examples of suitable particle size distributions are shown in Table 1.

TABLE 1

| U.S. Mesh Size | | Fly Ash (Wt. %) | Bottom Ash (Wt. %) |
|---|---|---|---|
| −10 | +45 | 0 | 0 |
| −15 | +70 | 1.25 | 25.0 |
| −70 | +100 | 2.16 | 35.0 |
| | −100 | 96.59 | 40.0 |

It has been determined that the average particle size of the final mixture of fine fly ash and coarser bottom ash utilized to produce shaped building products has a significant effect upon the physical and mechanical properties of the product and that the preferred average particle size of a given mixture used to produce a given product depends upon the size and shape of said product. The average particle size of the final mixture is controlled by the particle size distribution of each component and the proportion of each component.

The average particle size of the fine fly ash component utilized in the current invention generally ranges from 25 microns to 100 microns, as determined by multiplying the median particle size of each mesh fraction of the fly ash by the weight fraction of that mesh fraction and adding the resulting products, as illustrated in Table 1A which shows the particle size distribution and calculated average particle size of a typical fly ash suitable for use in practicing the current invention.

TABLE 1A

| MESH SIZE (U.S. Sieve #) | | PARTICLE SIZE RANGE (microns) | | MEDIAN PARTICLE SIZE (microns) | WEIGHT FRACTION | PRODUCT OF MEDIAN PARTICLE SIZE × WEIGHT PERCENT |
|---|---|---|---|---|---|---|
| −30 | +70 | −595 | +210 | 403 | 1.3 | 5 |
| −70 | +100 | −210 | +149 | 180 | 2.2 | 4 |
| −100 | +200 | −149 | +73 | 111 | 9.4 | 10 |
| −200 | | −73 | +0 | 37 | 87.2 | 32 |
| | | | | AVERAGE PARTICLE SIZE: | | 51 MICRONS |

Average Particle Size: 51 Microns

The particle size distribution and average particle size determined as heretofore described of the bottom ash employed can vary significantly and can be controlled by processing the bottom ash, such as by comminuting and/or sizing, to achieve the desired average particle size in the fly ash/bottom ash mixture. The calculated average particle size determined as heretofore described of typical processed "small", "medium", and "large" size bottom ashes suitable for use in practicing the invention are shown in Table 1.

TABLE 1B

| BOTTOM ASH PARTICLE SIZE | AV. PARTICLE SIZE |
| --- | --- |
| "Large" | 438 Microns |
| "Medium" | 261 Microns |
| "Small" | 133 Microns |

Shaped building products having mechanical properties equivalent to those of conventional building brick and block can be produced from mixtures of coal combustion fly ash and bottom ash in which the ratio of fly ash to bottom ash varies over a wide range. Specifically, for shaped building products ranging in size from a cylinder of about 1.3" diameter (D)×1" length (L) to a product having six rectangle faces and a size of about 4" length (L)×1.8" width (W)×0.8" thickness (T) produced from fly ash and bottom ash of the aforementioned particle size distributions, preferred mechanical properties can be achieved when the ratio of fly ash to bottom ash is in the range of about 1 part fly ash:4 parts bottom ash to about 1 part fly ash: 1 part bottom ash by weight. Lesser, but acceptable mechanical properties can be achieved when fly ash to bottom ash ratios of about 3:2 to about 4:1 by weight are employed. The properties attained are still suitable for numerous building applications. Accordingly, a suitable broad range for the fly ash:bottom ash ratio in such products is about 1 part fly ash:4 parts bottom ash to about 4 parts fly ash: 1 part bottom ash; with a preferred range being about 1 part fly ash:4 parts bottom ash to about 1 part fly ash: 1 part bottom ash. The most preferred ratio is about 1 part fly ash:4 parts bottom ash. All references in the ratios are by weight.

The average particle size of a fly ash/bottom ash mixture having a fixed fly ash:bottom ash ratio can be varied by altering the average particle size of either the fly ash, the bottom ash, or both, although it can best be achieved by controlling the average particle size of the bottom ash component. As shown in Table 1C, the average particle size of fly ash/bottom ash mixtures having fly ash:bottom ash ratios between 4:1 and 1:4 can be varied from approximately 68 microns to 361 microns by blending a single fly ash with three different grades of bottom ash. Obviously, mixes having average particle sizes differing from those illustrated in Table 1C can be prepared by further varying the particle size of the fly ash, the bottom ash, or both.

TABLE 1C

| FA/BA RATIO | AV. PARTICLE SIZE OF F.A./B.A. BLEND PREPARED USING "SMALL" PARTICLE B.A. (Microns) | AV. PARTICLE SIZE OF F.A./B.A. BLEND PREPARED USING "MEDIUM" PARTICLE B.A. (Microns) | AV. PARTICLE SIZE OF F.A./B.A. BLEND PREPARED USING "LARGE" PARTICLE B.A. (Microns) |
| --- | --- | --- | --- |
| 4:1 | 68 | 93 | 129 |
| 3:2 | 84 | 135 | 206 |
| 2:3 | 101 | 177 | 283 |
| 1:4 | 117 | 219 | 361 |

As the dimensions of prior art cementiciously-bonded and silicate crystal-bonded shaped structural products increase, the proportion of coarse particles utilized in their manufacture must be increased to maintain a specific strength level in the product. The method of the present invention may be employed to manufacture large shaped building blocks by increasing the weight of coarse bottom ash in the mixture to levels greater than that in the preferred ratio of 1 part fly ash:4 parts bottom ash and/or increasing the average particle size in said bottom ash. It has been determined that the minimum average particle size of fly ash/bottom ash mixtures preferred to achieve the desired strength level in shaped building products is about 90 microns. It is most preferred that the average particle size of such mixtures be in the range of 90 microns to 400 microns.

Figure 4:
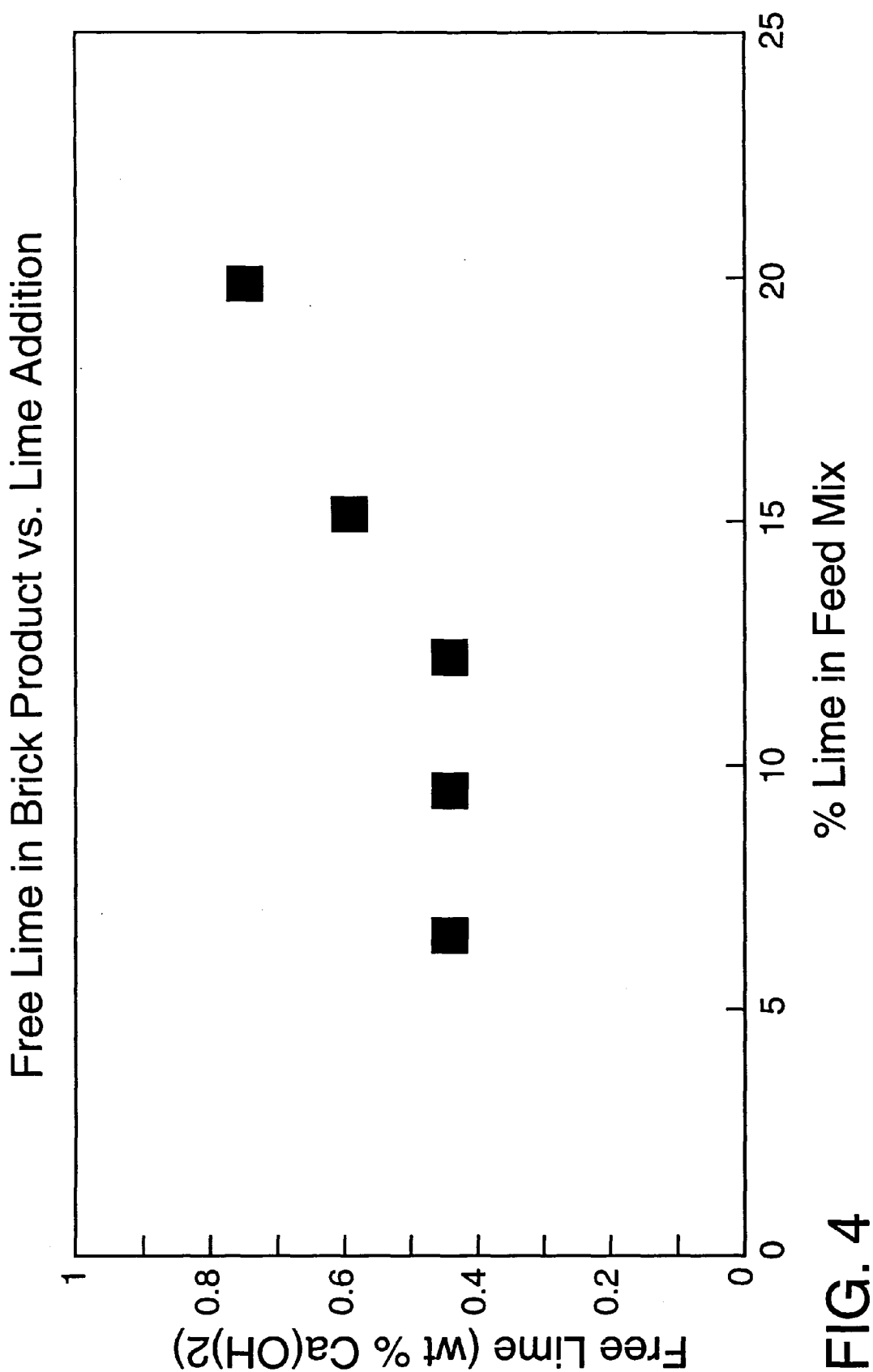
FIG. 4 is a graph showing the relationship between the total amount of calciferous additive added to a mixture of coal combustion fly ash and bottom ash and the amount of unreacted calciferous additive remaining in the structure of a shaped building product produced in accordance with the current invention.

It has been further determined that the amount of calciferous additive employed to optimize mechanical and physical properties of the shaped building products of this invention is controlled by the total surface area of the reactive particles in the mixture and that the amount of additive required increases as the total particle surface area in the mix increases. The preferred quantity of calciferous material added to a fly ash/bottom ash mixture is that which maximizes the ash/additive reaction and minimizes the amount of unreacted calciferous material, hereinafter referred to as "free lime", in the resultant product. FIG. 4 shows the amount of free lime remaining in bricks produced in accordance with the current invention as a function of the percentage (by weight) of calciferous material added to a fly ash/bottom ash mixture having an average particle size of 183 microns. In this instance, the amount of free lime remains constant at a low value of 0.45% up to calciferous material additions of 12% and increases gradually to a level of 0.75% at a calciferous material addition level of about 20%.

It has also been found that the optimum combination of strength and structural integrity may be achieved in shaped building blocks manufactured in accordance with this invention when the amount of the calciferous additive, which may be in the form of hydrated lime [$CaO.H_2O$] or quicklime [$CaO$], in the ash/additive mixture is maintained in the range of 5% to 20% by weight, and preferably in the range of 10% to 15% by weight of the mixture when added as hydrated lime. When the additive is in the form of quicklime or other calciferous material, the percentage of quicklime or other calciferous material added is adjusted to yield a final calcium content in the mix that is equivalent to the amount of calcium that would have been added to the mix from the use of hydrated lime at the desired percent addition.

It has also been determined that superior properties are achieved when the free water added to the mixture prior to shaping is maintained in the range of 5% to 15% by weight of the mixture including the water. When quicklime is substituted for hydrated lime, the amount of free water added to the mix is preferably increased by an amount equal to the amount of water required to hydrate the quicklime.

To maximize particle-to-particle contact within the shaped building block of the invention, crystal growth during hydrothermal treatment, and the compressive strength of the resultant product, it is preferred that the moistened mixture be shaped shortly after blending by compacting the mixture at a pressure in the range of 5,000 psi to 10,000 psi in a mold cavity having the desired shape. A compacting pressure of about 7,000 to 8,000 psi is preferred. Dwell time at pressure normally ranges from about 1 second to 3 minutes. Shaped building products compacted in this manner normally have an as-compacted density in the range of about 1.5 grams/cubic centimeter to 2.0 grams/cubic centimeter.

Hydrothermal curing of the compacted shape is preferably achieved by curing the as-compacted shape in a saturated steam atmosphere at a temperature ranging from 180° C. to 225° C. at a pressure between 150 psig and 350 psig for a period of 4 to 8 hours in an autoclave or similar apparatus. In order to maximize Tobermorite crystallite nucleation and growth and create the optimum interlocking Tobermorite crystallite matrix within the structure during curing, it is preferred that the shape be cured at about 190° C. to 210° C. for about 5 to 7 hours at a pressure of about 220 to 260 psig.

A comparison of relative peak intensities of X-ray diffraction (XRD) patterns obtained from shaped products produced from a mixture of about 1 part fly ash and about 4 parts bottom ash by weight processed in accordance with the method of the invention and cured at temperatures of 160° C., 200° C., and 225° C., is provided in Table 2. The data in Table 2 shows that, using the peak intensities of the product cured at 160° C. normalized to unity as the basis of comparison, the relative peak intensity of the Tobermorite phase in the structure of the product cured at 225° C. increased significantly (538%) relative to peak intensity of the Tobermorite phase in the structure of the product cured at 160° C. whereas the peak intensities of the other mineral species present in the products either decreased or increased less than 23% under similar conditions. While the relative peak intensity of XRD patterns is not directly proportional to an increase in mass of a species in a structure, these data indicate a significant increase in the amount and crystallinity of the Tobermorite phase in the structures cured at the higher temperatures and confirms the correlation between Tobermorite crystal formation and increased strength in the product.

TABLE 2

| MINERAL SPECIES | RELATIVE XRD PEAK INTENSITY @ 160° C. CURE | RELATIVE XRD PEAK INTENSITY @ 200° C. CURE | RELATIVE XRD PEAK INTENSITY @ 225° C. CURE | % INCREASE IN RELATIVE XRD PEAK INTENSITY BETWEEN 160° C. AND 225° C. CURES |
|---|---|---|---|---|
| QUARTZ | 1 | 1.14 | 0.91 | −9% |
| MULLITE | 1 | 1.25 | 1.16 | +16% |
| TOBERMORITE | 1 | 4.17 | 5.38 | +538% |
| CLACIUM ALUMINUM SILICATE HYDROXIDE | 1 | 0.47 | 0.66 | −34% |
| CALCITE | 1 | 0.67 | 0.95 | −5% |
| PORTLANDITE | 1 | 0.18 | 0.40 | −60% |
| HEMATITE | 1 | 1.30 | 1.22 | +22% |

Shaped building blocks produced in accordance with the method of the invention normally possess an internal structure similar to that shown in FIG. 3, a cured density in the range of about 95 pounds/cubic foot to 130 pounds/cubic foot, a compressive strength ranging from about 2,000 psi to 8,500 psi and water absorbivity of about 15% to 20%. Table 3 compares certain properties and characteristics of shaped building blocks of the present invention with those of conventional prior art clay building brick and concrete building block. The properties of the shaped building block produced in accordance with the method of the invention have mechanical properties which compare favorably with those of the prior art which are used as building bricks and blocks.

TABLE 3

| PROPERTY | PRODUCT OF INVENTION | RED CLAY BUILDING BRICK | CONCRETE BUILDING BLOCK |
|---|---|---|---|
| DENSITY (LB/CU FT) | 95–130 | 90–150 | 110–140 |
| COMPRESSIVE STRENGTH (PSI) | 2,000–8,500 | 1,500–12,000 | 1,000–5,000 |

The current invention also provides a method whereby other waste particulate siliceous materials may be substituted for a portion of the coal combustion fly ash or bottom ash utilized to produce the shaped building products of the invention. Specifically, it has been determined that fine non-ash waste particulate siliceous materials, including those generated during the processing of rock minerals, such as rock fines, quarry fines, pit fines, and materials of comparable mineralogical composition, hereinafter referred to individually and collectively as "rock fines", having an average particle size similar to or finer than that of the fly ash component can be substituted for up to 75% of the weight of the fly ash component in the starting mixture without adversely affecting the physical, chemical, or mechanical properties of the resultant shaped building product.

It has also been determined that coarser non-ash waste particulate siliceous materials, including for example, ground glass particles, rock fines, and materials of comparable mineralogical composition having average particle sizes equivalent to those of the "small", "medium", and "large" size bottom ashes shown in Table 1B, i.e., 438 microns, 261 microns, and 133 microns, respectively, can be substituted for up to 75% of the weight of the bottom ash of equivalent particle size without adversely affecting the physical, chemical, or mechanical properties of the resulting shaped building product.

The following examples provide specific preferred practices in employing the method of the invention.

EXAMPLES

The examples provided herein verify that shaped building bricks or blocks manufactured in accordance with the method of the present invention exhibit properties and characteristics that make said products suitable for use in residential and commercial building construction and, as shown by the data in Table 3, are viable alternatives to conventional prior art clay building bricks and concrete block.

Example 1

In this example, 1.3" D×1" L cylindrically shaped bodies were produced by (a) mixing 60 grams of fly ash and 240 grams of bottom ash, both commercially generated by a coal burning electric utility and both having particle size distributions falling generally within those recited in Table 1 hereof, to achieve a 1:4 ratio of fly ash:bottom ash; (b) adding 39 grams of hydrated lime to achieve a lime content in the total ash-lime mixture of 11.5% by weight; (c) adding 30 grams of free water to the ash-lime mixture to achieve a total water content in the moistened mixture of 8.1% by weight; (d) blending the moistened mixture to achieve uniformity; (e) compacting the moistened mixture to the aforesaid cylindrical shape by application of pressure at a level of 10,000 psi and maintaining the compact under said pressure for a period of 3 minutes; and (f) curing the compacted shape in a saturated steam atmosphere in an autoclave at a temperature of 200° C. and a pressure of 240 psig for a period of 6 hours.

The compressive strength of the shaped products so produced, determined in accordance with ASTM Test Method C67 seven days after curing, was 6,325 psi, thereby demonstrating that the compressive strength of shaped products based upon a fly ash:bottom ash ratio of 1:4 and produced in accordance with the method of the invention is suitable for building construction applications and competitive with that of clay building brick.

Example 2

In this example, 1.3" D×1" L cylindrically shaped bodies were produced by (a) mixing 120 grams of fly ash and 180 grams of bottom ash, both commercially generated by a coal burning electric utility and both having particle size distributions falling generally within those recited in Table 1 hereof, to achieve a 2:3 ratio of fly ash:bottom ash by weight; (b) adding 30 grams of hydrated lime to achieve a lime content in the total ash-lime mixture of 9.1% by weight; (c) adding 30 grams of free water to the ash-lime mixture to achieve a total water content in the moistened mixture of 8.3% by weight; (d) blending the moistened mixture to achieve uniformity; (e) compacting the moistened mixture to the aforesaid cylindrical shape by application of pressure at a level of 7,500 psi and maintaining the compact under said pressure for a period of 2 minutes; and (f) curing the compacted shape in a saturated steam atmosphere in an autoclave at a temperature of 200° C. and a pressure of 240 psig for a period of 2 hours.

The compressive strength of the shaped products so produced, determined in accordance with ASTM Test Method C67 seven days after curing, was 5,767 psi thereby demonstrating that the compressive strength of shaped products based upon a fly ash:bottom ash ratio of 2:3 and produced in accordance with the method of the invention is suitable for building construction applications and competitive with that of clay building brick.

Example 3

In this example, 1.3" D×1" L cylindrically shaped bodies were produced by (a) mixing 156 grams of fly ash and 144 grams of bottom ash, both commercially generated by a coal burning electric utility and both having particle size distributions generally falling within those recited in Table 1 hereof, to achieve a 1.08:1 ratio of fly ash:bottom ash; (b) adding 39 grams of hydrated lime to achieve a lime content in the total ash-lime mixture of 11.5% by weight; (c) adding 30 grams of free water to the ash-lime mixture to achieve a total water content in the moistened mixture of 8.1% by weight; (d) blending the moistened mixture to achieve uniformity; (e) compacting the moistened mixture to the aforesaid cylindrical shape by application of pressure at a level of 7,500 psi and maintaining the compact under said pressure for a period of 2 minutes; and (f) curing the compacted shape in a saturated steam atmosphere in an autoclave at a temperature of 200° C. and a pressure of 240 psig for a period of 6 hours.

The compressive strength of the shaped products so produced, determined in accordance with ASTM Test Method C67 seven days after curing, was 6,840 psi, thereby demonstrating that the compressive strength of shaped products based upon a fly ash:bottom ash ratio of essentially 1:1 and produced in accordance with the method of the invention is suitable for building construction applications and competitive with that of clay building brick.

Example 4

In this example, 1.3" D×1" L cylindrically shaped bodies were produced by (a) mixing 180 grams of fly ash and 120 grams of bottom ash, both commercially generated by a coal burning electric utility and both having particle size distributions generally falling with those recited in Table 1 hereof, to achieve a 3:2 ratio of fly ash:bottom ash; (b) adding 30 grams of hydrated lime to achieve a lime content in the total ash-lime mixture of 9.1% by weight; (c) adding 30 grams of free water to the ash-lime mixture to achieve a total water content in the moistened mixture of 8.3% by weight; (d) blending the moistened mixture to achieve uniformity; (e) compacting the moistened mixture to the aforesaid cylindrical shape by application of pressure at a level of 10,000 psi and maintaining the compact under said pressure for a period of 2 minutes; and (f) curing the compacted shape in a saturated steam atmosphere in an autoclave at a temperature of 200° C. and a pressure of 240 psig for a period of 6 hours.

The compressive strength of the shaped products so produced, determined in accordance with ASTM Test Method C67 seven days after curing, was 3,233 psi, thereby demonstrating that the compressive strength of shaped products based upon a fly ash:bottom ash ratio of 3:2 and produced in accordance with the method of the invention is suitable for construction applications and competitive with that of concrete building block.

Example 5

In this example, 1.3" D×1" L cylindrically shaped bodies were produced by (a) mixing 240 grams of fly ash and 60 grams of bottom ash, both commercially generated by a coal burning electric utility and both having particle size distributions generally falling within those recited in Table 1 hereof, to achieve a 4:1 ratio of fly ash:bottom ash; (b) adding 30 grams of hydrated lime to achieve a lime content in the total ash-lime mixture of 9.1% by weight; (c) adding 30 grams of free water to the ash-lime mixture to achieve a total water content in the moistened mixture of 8.3% by weight; (d) blending the moistened mixture to achieve uniformity; (e) compacting the moistened mixture to the aforesaid cylindrical shape by application of pressure at a level of 10,000 psi and maintaining the compact under said pressure for a period of 2 minutes; and (f) curing the compacted shape in a saturated steam atmosphere in an autoclave at a temperature of 200° C. and a pressure of 240 psig for a period of 6 hours.

The compressive strength of the shaped products so produced, determined in accordance with ASTM Test Method C67 seven days after curing, was 3,733 psi, thereby demonstrating that the compressive strength of shaped products based upon a fly ash:bottom ash ratio of 4:1 and produced in accordance with the method of the invention are suitable for building construction applications and competitive with that of concrete building block.

A comparison of the compressive strengths of the 1:4, 2:3, 1:1, 3:2, and 4:1 Fly Ash:Bottom Ash samples prepared from Bottom ashes of different particle size distributions with those specified for prior art clay building brick and concrete block construction products is presented in Table 4. This confirms the compressive strength of the building blocks of the present invention being well within the accepted prior art brick and block compressive strength ranges.

TABLE 4

| MATERIAL | AVERAGE COMPRESSIVE STRENGTH @ 7 DAYS AFTER CURING (PSI) |
|---|---|
| 1:4 FLY ASH:BOTTOM ASH | 7,340 |
| 2:3 FLY ASH:BOTTOM ASH | 5,767 |
| 1:1 FLY ASH:BOTTOM ASH | 6,840 |
| 3:2 FLY ASH:BOTTOM ASH | 3,233 |
| 4:1 FLY ASH:BOTTOM ASH | 3,733 |
| CLAY BRICK | 1,500–12,000 |
| CONCRETE BLOCK | 1,000–5,000 |

Example 6

This example illustrates the effect on mechanical properties of varying the average particle size of coal combustion fly ash/bottom ash mixtures by altering the fly ash:bottom ash ratio in the mix. The fly ash used in the mixture had an average particle size of 51 microns. The average particle size of the bottom ash was 133 microns. Four mixtures prepared by blending the fly ash and bottom ash to achieve fly ash:bottom ash ratios of 1:4, 2:3, 3:2, and 4:1 to achieve average particle sizes of 117 microns, 107 microns, 84 microns, and 68 microns, respectively.

In this example, 1.3" D×1" L cylindrically shaped bodies were produced by (a) blending 100 parts of each of the aforementioned fly ash/bottom ash mixtures with 10 parts of hydrated lime to achieve a lime content in the total ash-lime mixture of approximately 9% by weight; (b) adding free water to each ash-lime mixture to achieve a total water content in the moistened mixture of approximately 9% by weight; (c) blending the moistened mixture to achieve uniformity; (d) compacting the moistened mixture to the aforesaid cylindrical shape by application of pressure at a level of 10,000 psi and maintaining the compact under said pressure for a period of 2 minutes; and (e) curing the compacted shape in a saturated steam atmosphere in an autoclave at a temperature of 200° C. and a pressure of 240 psig for a period of 6 hours.

The compressive strengths of the shaped products so produced, determined in accordance with ASTM Test Method C67, shown in Table 5, ranged from 2,600 psi for the shaped product produced from the fine ash mixture to 4,667 psi, for the shaped product produced from the coarsest ash mixture. These data demonstrate that mechanical properties of the shaped bodies increased as the average particle size of the ash mix increased. It was further demonstrated that the compressive strength of the shaped products based upon the aforementioned fly ash/bottom ash mixtures having average particle sizes in excess of 84 microns and in accordance with the method of the current invention is suitable for building construction applications and competitive with that of commercial clay building brick suitable for severe weather application which must exhibit a compressive strength of at least 3,500 psi in accordance with ASTM Specification Numbers C67–94 and C62–92C.

TABLE 5

| FLY ASH: BOTTOM ASH RATIO | AVERAGE PARTICLE SIZE (MICRONS) | COMPRESSIVE STRENGTH (PSI) |
| --- | --- | --- |
| 1:4 | 116.9 | 4,667 |
| 2:3 | 100.5 | 3,967 |
| 3:2 | 84.0 | 2,533 |
| 4:1 | 67.6 | 2,600 |

Example 7

This example illustrates the effect on mechanical properties of varying the average particle size of coal combustion fly ash/bottom ash mixtures by altering the average particle size of two fly ash:bottom ash mixtures while maintaining a constant fly ash:bottom ash ratio of 1:4 in both. In the first mixture, the average particle size of the fly ash was 51.2 microns, the average particle size of the bottom ash was 133.3 microns, and the average particles size of the resultant mixture was 116.9 microns. In the second mixture, the average particle size of the fly ash was 51.2 microns, the average particle size of the bottom ash was 314.8 microns, and the average particle size of the mixture was 262 microns.

In this example, 1.3" D×1" L cylindrically shaped bodies were produced by (a) blending 100 parts of each of the aforementioned fly ash/bottom ash mixtures with 10 parts of hydrated lime to achieve a lime content in the total ash-lime mixture of approximately 9% by weight; (b) adding free water to each ash-lime mixture to achieve a total water content in the moistened mixture of 9% by weight; (c) blending the moistened mixture to achieve uniformity; (d) compacting the moistened mixture to the aforesaid cylindrical shape by application of pressure at a level of 10,000 psi and maintaining the compact under said pressure for a period of 2 minutes; and (e) curing the compacted shape in a saturated steam atmosphere in an autoclave at a temperature of 200° C. and a pressure of 240 psig for a period of 6 hours.

The compressive strengths of the shaped products so produced, determined in accordance with ASTM Test Method C67 were 4,667 psi for the shaped product produced from the finer ash mixture and 7,125 psi, for the shaped product produced from the coarser ash mixture. These data demonstrate that mechanical properties of the shaped bodies increased as the average particle size of the ash mix increased and that the compressive strengths of the shaped products so produced are suitable for construction applications and competitive with that of commercial clay building brick.

Example 8

This example illustrates the effect on mechanical properties of substituting a non-ash particulate siliceous material for a portion of the coal combustion fly ash and/or bottom ash in the starting mix used in the manufacture of shaped construction products. The non-ash siliceous material used to demonstrate this effect was waste "Rock Fines" generated during the industrial processing of rock minerals. Two grades of rock fines, a "small-particle grade" having an average particle size of 37.6 microns and a "large-particle grade" exhibiting an average particle size of 525.5 microns, were employed either together or separately as substitutes for the coal combustion ash in the various starting mixtures. The small-particle grade was substituted for the fly ash in the mix, whereas the large particle grade was substituted for the bottom ash.

Three mixes were prepared in which either small-particle rock fines were substituted for a portion of the fly ash and/or large-particle rock fines were substituted for a portion of the bottom ash present. The ratio of fine material (i.e., fly ash or small-particle rock fines) to coarse material (i.e., bottom ash or large-particle rock fines) in each mix was 1:1. A fourth sample consisting of 100% small-particle rock fines was prepared for comparison purposes. The final mix compositions of each sample are shown in Table 6.

In Mix 1, small-particle rock fines were substituted for 50% of the fly ash to yield a mixture consisting of 50% bottom ash, 25% fly ash, and 25% small-particle rock fines having an average particle size of 180 microns.

In Mix 2, small-particle rock fines were substituted for 50% of the fly ash and large-particle rock fines were substituted for 50% of the bottom ash to yield to yield a mixture consisting of 25% bottom ash, 25% large-particle rock fines, 25% fly ash, and 25% small-particle rock fines having an average particle size of 249 microns.

In Mix 3, fly ash accounted for 25% of the mix, bottom ash accounted for 25% of the mix, small-particle rock fines accounted for 33.33% of the mix, and large-particle rock fines accounted for 16.7% of the mix. The average particle size of Mix 3 was 203 microns.

Mix 4, the comparison sample, consisted solely of small-particle rock fines having an average particle size of 38 microns.

In this example, 1.3" D×1" L cylindrically shaped bodies were produced by (a) blending 100 parts of each of the aforementioned mixtures with 16 parts of hydrated lime to achieve a lime content in the total ash-lime mixture of approximately 14% by weight; (b) adding free water to each ash-lime mixture to achieve a mix consistency equivalent to that of a mixture having a total water content in the moistened mixture of approximately 11% by weight; (c) blending the moistened mixture to achieve uniformity; (d) compacting the moistened mixture to the aforesaid cylindrical shape by application of pressure at a level of 7,500 psi and maintaining the compact under said pressure for a period of 1 to 2 minutes; and (e) curing the compacted shape in a saturated steam atmosphere in an autoclave at a temperature of 200° C. and a pressure of 240 psig for a period of 6 hours.

The compressive strengths of the shaped products produced in accordance with the aforementioned procedure were determined in accordance with ASTM Test Method C67 after curing. As illustrated in Table 6, the strengths of the three mixes in which rock fines were substituted for either, or both, of the fly ash and bottom ash ranged from 5,438 psi to 7,160 psi compared to that of the product produced from 100% rock fines which was only 2,280 psi.

These data demonstrate that shaped bodies produced in accordance with the method of the current invention in which non-ash particulate siliceous material, which may or may not be a process waste, is substituted for coal combustion ashes exhibit compressive strengths that permit the shaped bodies to be used in construction applications as a substitute for commercial building bricks and blocks.

TABLE 6

| | AVERAGE PARTICLE SIZE (Microns) | | | | | |
|---|---|---|---|---|---|---|
| MIX | FLY ASH | BOTTOM ASH | SMALL ROCK FINES | LARGE ROCK FINES | MIX | COMP. STR. (PSI) |
| 1 | 25 | 50 | 25 | — | 180 | 5,438 |
| 2 | 25 | 25 | 25 | 25 | 249 | 6,375 |
| 3 | 25 | 25 | 33.33 | 16.67 | 203 | 7,160 |
| 4 | — | — | 100 | — | 38 | 2,880 |

The invention is also adapted to provide colored building bricks, if desired. Shaped building bricks having colors of a permanent nature that differ from the gray color normal to products produced from a mixture of fly ash and bottom ash can be produced in accordance with this invention by incorporating into the mixture either prior to blending with water, as is preferred, or prior to compacting, between 2% and 15% by weight of a naturally colored mineralogical components into the fly ash:bottom ash mix.

The mineralogical colorants added can be naturally-occurring minerals or synthetically produced materials such as those used to color fired ceramics and similar products. In order to assure that the structural and aesthetic characteristics of the shaped building products are preserved, the color additives must be stable when exposed to conditions of the manufacturing process and field service.

The coloration of the products of the current invention can be made uniform throughout the product by blending the mineralogical colorant uniformly throughout the constituent mixture prior to compacting. Alternatively, the coloration can be restricted to a surface of the product by layering the colored mix and the non-colored mix in the compacting mold. Obviously, a multi-colored or multi-layered or patterned product can be produced by carefully placing controlled volumes of different-colored mixes in desired locations within the compacting mold prior to applying the compacting pressure.

The number of basic colors, shades of each color, and color patterns that can be achieved in the heretofore described manner are numerous.

For example, red bricks have been produced by adding about 2–3% by weight of hematite to a 1:4 fly ash:bottom ash ratio mixture. Black bricks can be produced by adding magnetite to the blend. Bricks exhibiting other permanent colors can be produced by adding a mineralogical compound of the desired color to the desired fly ash:bottom ash mixture.

Various shades of blue bricks can be produced by blending one, or more, mineralogical blue colorants of differing shade into the brick mix. Blue colorants suited to producing colored bricks in accordance with the current invention include, but are not limited to, mineralogical compounds containing cobalt and aluminum, with or without nickel, chromium, and zinc; compounds containing zirconium, vanadium, and silicon; and other mineralogical compounds imparting equivalent permanent blue coloration.

Various shades of yellow bricks can be produced by blending one, or more, mineralogical yellow colorants of differing shade into the brick mix. Yellow colorants suited to producing colored bricks in accordance with the current invention include, but are not limited to, mineralogical compounds containing zirconium and one or more elements from the group consisting of praseodymium, silicon, and vanadium; compounds containing vanadium and tin; compounds containing aluminum and manganese; compounds containing cadmium and zinc; and other mineralogical compounds imparting equivalent permanent yellow coloration.

Various shades of green bricks can be produced by blending one, or more, mineralogical green colorants of differing shade into the brick mix. Green colorants suited to producing colored bricks in accordance with the current invention include, but are not limited to, mineralogical compounds containing cobalt and one or more elements from the group consisting of nickel, zinc, titanium, chromium and aluminum; and other mineralogical compounds imparting equivalent permanent green coloration.

In addition to the aforementioned use of hematite, various shades of red and orange bricks can be produced by blending one, or more, mineralogical red or orange colorants of differing shade into the brick mix. Red and orange colorants suited to producing colored bricks in accordance with the current invention include, but are not limited to, mineralogical compounds containing calcium and tin, chromium, and silicon; compounds containing zirconium, iron, and silicon; compounds containing aluminum and manganese; compounds containing cadmium, sulfur and selenium; and other mineralogical compounds imparting equivalent permanent red or orange coloration.

Various shades of purple bricks can be produced by blending one, or more, mineralogical purple colorants of differing shade into the brick mix. Purple colorants suited to producing colored bricks in accordance with the current invention include, but are not limited to, mineralogical compounds containing cobalt and silicon; compounds containing tin and chromium; and other mineralogical compounds that impart equivalent permanent purple coloration.

Various shades of brown bricks can be produced by blending one, or more, mineralogical brown colorants of differing shade into the brick mix. Brown colorants suited to producing colored bricks in accordance with the current invention include, but are not limited to, mineralogical compounds containing zinc and one or more elements from the group consisting of chromium, aluminum, zinc, and iron; compounds containing iron and chromium or manganese; and other mineralogical compounds that impart equivalent permanent brown coloration.

Various shades of black bricks can be produced by blending one, or more, mineralogical black colorants of differing shade into the brick mix. Black colorants suited to producing colored bricks in accordance with the current invention include, but are not limited to, mineralogical compounds containing copper and one or more elements from the group consisting of cobalt, nickel, chromium, iron, and manganese; compounds containing iron and cobalt or chromium; compounds containing titanium, vanadium, and antimony; and other mineralogical compounds that impart equivalent permanent black coloration.

Various shades of gray bricks can be produced by blending one, or more, mineralogical gray colorants of differing shade into the brick mix. Gray colorants suited to producing colored bricks in accordance with the current invention include, but are not limited to, mineralogical compounds containing tin and antimony; compounds containing zirconium and one or more elements from the group consisting of cobalt, nickel, and silicon; and other mineralogical compounds that impart equivalent permanent gray coloration.

A wide range of other colorations can be achieved by blending two or more of the aforementioned color groups. For example, red and blue colorants can be blended prior to incorporation into the brick constituent mix to produce purple bricks, red and yellow colorants can be blended to produce orange bricks, etc. The shade and intensity of the color are dependent upon the amount of colored mineral or minerals employed.

As a result of the aforementioned options, it is possible to produce decorative shaped building products in a wide variety of colors, shades, and patterns.

For convenience of disclosure, the disclosure herein has made reference to specific compositions, particle size distributions, processing parameters, colors, and product configurations. It will be obvious to those skilled in the art that one may practice the invention employing other compositions, particle size distributions, processing parameters, colors, and product configurations.

While, for convenience of disclosure, the above discussion and illustrations have made reference to the use of lime, it will be obvious to those skilled in the art that calcium-containing flue gas desulfurization sludge or similar materials can also be used as a source of calcium.

While the discussion herein has made reference to shaped building products such as building brick and block, it will be apparent to those skilled in the art that one may practice the invention to produce shaped construction aggregate and shapes for non-construction purposes.

It will be appreciated that the method of this invention provides a cost effective means for producing commercially viable strong, stable shaped building bricks or blocks from siliceous coal combustion wastes with or without the addition of particulate non-ash mineralogical wastes without requiring reduction in carbon content of the coal combustion wastes. The increased commercial use of such wastes resulting from this invention will significantly reduce the volume of coal combustion wastes and non-ash mineralogical wastes that must be disposed of in landfills. The utilization of this invention to achieve this end is, therefore, of great environmental benefit to society.

Whereas particular embodiments of the invention have been described herein for purposes of illustration, it will be evident to those skilled in the art that numerous variations of the details may be made without departing from the invention as defined in the appended claims.

We claim:
1. A method of making a shaped product comprising:

establishing a blend by admixing a major portion by weight of (a) a mixture of a coal combustion fly ash and a coal combustion bottom ash with (b) a calciferous additive in proportions which establish a mineralogical crystalline phase, said coal combustion bottom ash having an average particle size greater than an average particle size of said coal combustion fly ash;

blending water with said blend to create a moistened blend; forming said moistened blend into a shaped product by compacting said moistened blend at a pressure of about 5,000 to 10,000 psi;

hydrothermally treating said shaped product to facilitate the formation of interlocking mineralogical crystals therein; and admixing said mixture of said coal combustion fly ash and said coal combustion bottom ash to create said mixture with an average particle size of about 90 to 400 microns.

2. The method of claim 2 including employing said coal combustion fly ash with an average particle size of about 25 to 100 microns.

3. The method of claim 1 including employing on a weight basis said coal combustion fly ash in a ratio to said coal combustion bottom ash of about 1 to 4 to about 4 to 1.

4. The method of claim 3 including employing on a weight basis said coal combustion fly ash in a ratio to said coal combustion bottom ash of about 1 to 4 to about 1 to 1.

5. The method of claim 1 including employing as said calciferous additive a material selected from the group consisiting of lime and flue gas desulfurization sludge.

6. The method of claim 5 including employing said calciferous additive in an amount of about 5 to 20 percent of the dry mixture on a weight basis.

7. The method of claim 5 including employing lime as said calciferous additive in an amount of about 10 to 15 percent of the dry mixture on a weight basis.

8. The method of claim 1 including adding to said mixture of said coal combustion fly ash and said coal combustion bottom ash about 5 to 15 percent water on a wet mixture weight basis.

9. The method of claim 1 including employing on a weight basis said coal combustion fly ash in a ratio to said coal combustion bottom ash of about 1 to 4 to about 4 to 1;

employing said calciferous additive in an amount of about 5 to 20 percent of the total mixture on a weight basis; and employing about 5 to 15 percent water on a weight of wet mixture basis.

10. The method of claim 1 including effecting said hydrothermal treatment at a temperature of about 180 to 225 degrees Celsius for about 4 to 8 hours.

11. The method of claim 10 including effecting said hydrothermal treatment at a pressure of about 140 to 350 psi.

12. The method of claim 1 including effecting said compacting in a mold having a cavity of the desired shape for about 1 second to 3 minutes.

13. The method of claim 1 including creating a Tobermorite crystalline phase as said mineralogical crystalline phase.

14. The method of claim 1 including employing said method to make a building block.

15. The method of claim 14 including creating said building block having a compressive strength of about 2,000 to 8,500 psi.

16. The method of claim 15 including creating said building block having a compressive strength of about 3,500 to 8,500 psi.

17. The method of claim 1 including adding to said mixture a mineralogical coloring agent to produce a shaped product the desired color.

18. The method of claim 17 including effecting said coloring agent addition prior to blending said water into said mixture.

* * * * *